2,903,339
SULFURIC ACID PURIFICATION

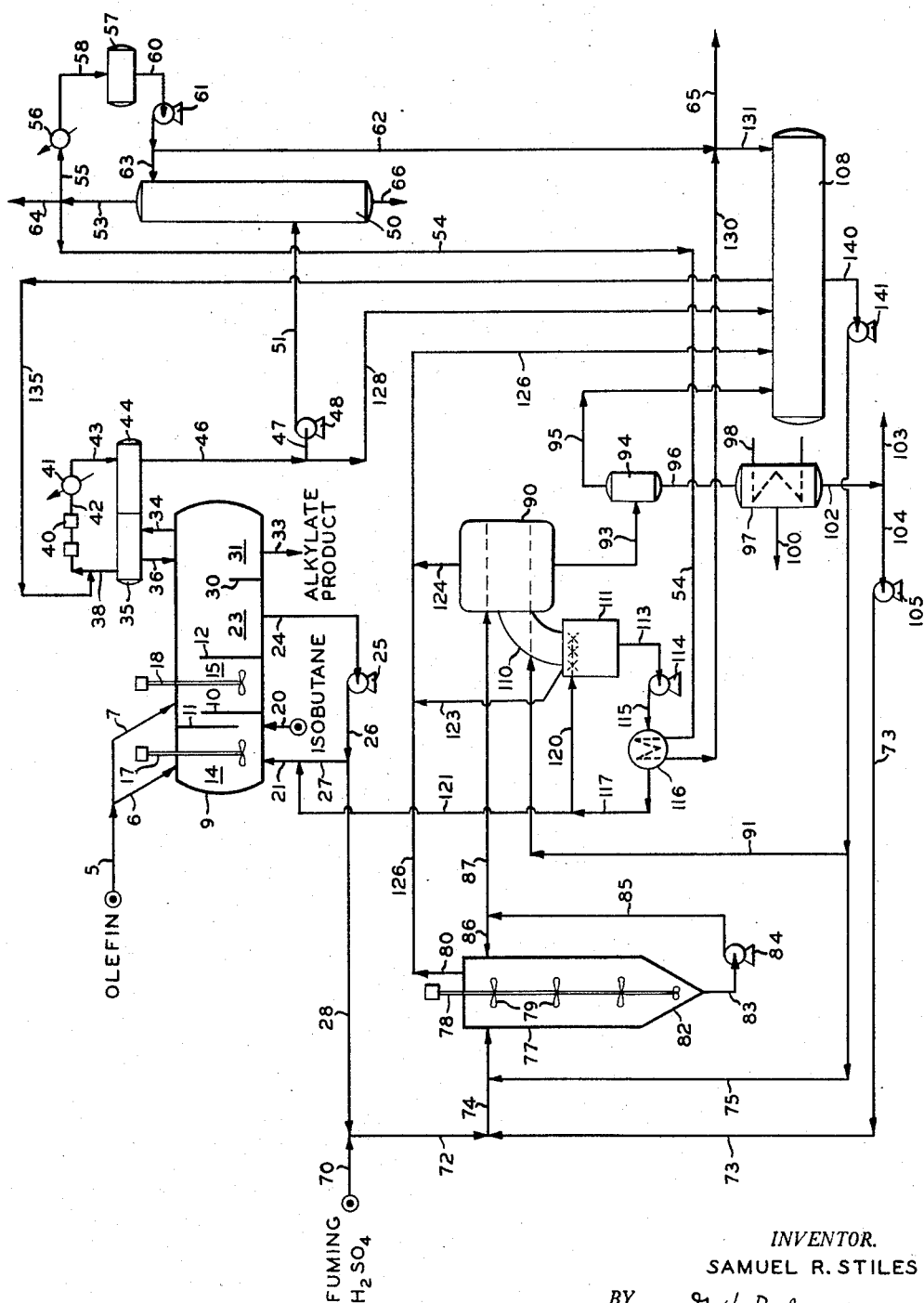

Samuel R. Stiles, Cresskill, N.J., assignor to The M. W. Kellogg Company, Jersey City, N.J., a corporation of Delaware Application July 26, 1955, Serial No. 524,537

4 Claims. (Cl. 23—172)

This invention relates to an improved method of purifying contaminated sulfuric acid, and more particularly, it pertains to a method of purifying sulfuric acid by crystallization whereby serious operating difficulties are overcome.

Spent sulfuric acid contaminated with polar and/or non-polar impurities can be purified by crystallization of the spent acid and subsequent separation of the acid crystals from the mother liquor containing a substantial proportion of the impurities. Under the conditions of crystallization, it is found that the mother liquor is highly viscous and, therefore, the acid crystals in the mother liquor tend to agglomerate and cause serious operating difficulties in the system. This problem exists to a lesser extent in those systems utilizing an organic liquid spacer as the medium for crystallization, however, in view of the immiscible nature of the organic liquid spacer, there is still the tendency for the acid crystals to agglomerate if the mother liquor is allowed to separate substantially from the organic liquid spacer. By means of this invention, a method of operation is proposed whereby these difficulties are overcome substantially.

An object of this invention is to provide an improved method for the purification of sulfuric acid contaminated with polar and/or non-polar impurities.

Another object of this invention is to provide an improved method of purifying sulfuric acid contaminated with polar and/or non-polar impurities by crystallization whereby operating difficulties associated with the agglomeration of acid crystals are substantially overcome.

Other objects and advantages of this invention will become apparent from the following description and explanation thereof.

The present invention is concerned with a process in which sulfuric acid is crystallized in a crystallization zone to produce mother liquor and crystals of sulfuric acid, and the process is operated to prevent agglomeration of acid crystals by the method which comprises crystallizing the sulfuric acid under conditions of turbulent agitation in the crystallization zone sufficient to prevent agglomeration of the crystals.

In those cases where an organic or inorganic liquid spacer is employed in the purification treatment such that sulfuric acid crystals, mother liquor and liquid spacer are present in the crystallization zone, operating difficulties are substantially overcome by the method which comprises crystallizing the sulfuric acid under conditions of turbulent agitation in the crystallization zone sufficient to prevent substantial separation of mother liquor from the spacer and thereby preventing agglomeration of the crystals.

In another aspect of this invention, where spent sulfuric acid is crystallized to produce mother liquor and acid crystals in a crystallization zone and where a slurry of acid crystals and mother liquor is passed from the crystallization zone to a separation zone by means of a transfer zone, the improvement comprises crystallizing the spent acid under conditions of turbulent agitation in the crystallization zone thereby producing a slurry of acid crystals and mother liquor without significant agglomeration of crystals, and passing the slurry from the crystallization zone to the transfer zone for subsequent passage to the separation zone at a linear velocity in excess of about 15 feet per second.

The process of this invention is applicable to any spent sulfuric acid containing polar and/or non-polar impurities. It should be understood that for the purposes of this invention water is considered as a polar impurity by reason of its attraction or affinity for sulfuric acid. The spent acid may contain a total acidity ranging considerably in value, however, frequently, this invention will find use for the purification of a spent acid containing at least about 80% total acidity, determined as $H_2SO_4$, and more particularly, the acid will contain a total acidity of at least about 90% and as high as 96% or higher on the same basis. The spent acid can be derived from any source, namely, an acid resulting from the treatment of lubricating oils, gasoline and naphtha, for the removal of mono-olefinic or diolefinic materials, with or without the removal of sulfur compounds, or the acid can be derived from a process in which a mono-olefin is alkylated with an isoparaffin in the presence of sulfuric acid.

In the latter application, the spent acid contains alkylate or the desired product and acid esters or mono-alkyl sulfate, the di-ester or dialkyl sulfate, with or without water. The water concentration of the spent acid can be reduced to zero value, or to a maximum of 7% of water, by treatment with $SO_3$ or fuming sulfuric acid. Generally, the spent acid contains about 0 to about 5% or 0.01 to 2% of non-polar impurities and about 0 to about 10 or 0.1 to 5% of polar impurities. In the case of spent alkylation acid, the acid ester is present in an amount of about 1 to about 6%; the di-ester is about 0 to about 8%, and water is about 0 to about 4% of the total spent acid, on a weight basis. The non-polar impurity is, for example, the alkylate polymer or di-ester, e.g., dialkyl sulfate, etc.; whereas the polar impurity is the acid ester or mono-alkyl sulfate, water, etc.

The crystallization of the spent acid takes place at a temperature ranging from about —100° F. to about 50° F. In the case where crystallization takes place in the absence of a liquid spacer, it is preferred to employ a temperature of about 0° to about 50° F. by reason that the resultant mother liquor is highly viscous, and it would be desirable to safeguard against the strong tendency for the acid crystals to agglomerate within the mother liquor, which undergoes a high increase in viscosity at low temperatures. When the present invention is practiced by using a liquid spacer, it is preferred that the crystallization temperature range from about —50° F. to a temperature below 0° F. or, generally, the temperature of crystallization can be less than 0° F. The use of the liquid spacer tends to offset the effect of the highly viscous nature of the mother liquor, thus making possible the use of lower temperatures at which there is an increase in yield of acid crystals. The pressure of the crystallization zone can vary over a wide range, namely, it can be subatmospheric, atmospheric or superatmospheric, for example, the pressure of the crystallization step can be about 2 mm. Hg absolute to about 100 p.s.i.g., although, more usually, it will vary from about 2 inches $H_2O$ to about 1 atmosphere.

The liquid spacer to be used for this invention is any organic or inorganic liquid which is non-reactive and immiscible with sulfuric acid and it is preferably, although not necessarily, miscible with the impurities contained in the spent acid. The liquid spacer can be an aliphatic hydrocarbon, preferably a light aliphatic hydrocarbon containing 1 to 15 carbon atoms, halogenated aliphatic hydrocarbons, halocarbons, aliphatic ethers or an inorganic liquid, e.g., sulfur oxide, viz., $SO_2$, etc. The quantity of liquid spacer employed in the crystallization zone relative to the quantity of sulfuric acid being processed on a volumetric basis is about 0.1 to about 100 parts per part of acid, although more usually about 0.5 to about 50 parts of spacer per part of acid are employed. It is also contemplated within the scope of the present invention to employ a volatilizable organic or inorganic liquid as an auto-refrigerant. In connection with auto-refrigeration, the volatilizable liquid is fed to the crystallization zone at a rate and under such conditions within the zone that a portion of the spacer liquid is volatilized or vaporized thereby cooling the crystallization medium or acid to the desired temperature level. For this purpose, lighter paraffins containing about 1 to 4 carbon atoms are especially suited such as, for example, methane, ethane, propane, n-butane, isobutane, etc.

Optionally, the crystals of sulfuric acid, following separation from the mother liquor, with or without spacer material, are subjected to a washing operation. In the washing operation, any of the liquid spacers described above can be employed. However, it should be borne in mind that the use of a wash liquor which is dissimilar with the spacer material employed in the crystallization step may serve to complicate the process, and for that reason, it is preferred that the spacer material be of the same composition as the wash liquor. The washing step is conducted at a temperature of about $-50°$ F. to about $50°$ F., however, the important factor being that the temperature is below the level at which the crystals melt. The washing step is conducted by using about 1 to about 1000 parts by volume of wash liquor, more usually about 5 to about 25 parts by volume of wash liquor per part by volume of acid crystals.

In accordance with the improvement of this invention, the crystallization of spent sulfuric acid, with or without the use of an organic or inorganic liquid spacer, is conducted in a crystallization zone under conditions of turbulent agitation. By turbulent agitation, it is meant, for example, in the case of crystallizing sulfuric acid in the absence of a liquid spacer, that a slurry of acid crystals and mother liquor is formed without subsequent agglomeration of acid crystals which would cause operating difficulties by plugging the exit line from the crystallization zone. Generally, the agitation should be conducted under conditions sufficiently turbulent to prevent the formation of agglomerates or crystal masses having an approximate length or average diameter of more than 1/8 of an inch. In a preferred aspect of this invention, by suitable agitation of the crystallization medium, there is little agglomeration and the size of the crystals or agglomerates will appear to be in the range of about 1/100 to about 1/16 of an inch in diameter. When the liquid spacer is employed, an alternative criterion to follow is that the agitation should be sufficient to prevent substantial separation of the mother liquor from the liquid spacer. The tendency for the acid crystals to agglomerate in the liquid spacer is substantially less than in the mother liquor, consequently, by maintaining a dispersion or emulsion of mother liquor in the liquid spacer, or vice versa, the tendency for the acid crystals to agglomerate is reduced substantially and little difficulty may be experienced in the operation of the unit. It is preferred to disperse the mother liquor and crystals in the liquid spacer. Similarly, in the case where crystallization is conducted in the absence of the organic liquid spacer, the size of the agglomerates or crystals should be in the range specified hereinabove, otherwise operating difficulties will be experienced, due to plugging of the outlet lines, etc.

In the operation of the present invention, it is also contemplated recycling a portion of the slurry of acid crystals in mother liquor, with or without organic liquid spacer, to the crystallization zone for the dual purpose of (1) seeding or initiating the crystallization of the incoming sulfuric acid, and (2) enhancing the turbulent conditions maintained within the crystallization zone. For this purpose, the recycle of slurry on a volumetric basis relative to the quantity of acid being fed for crystallization thereto is about 10 to about 1000:1, more usually about 50 to about 250:1. It is preferred that the slurry of acid crystals be recycled to the crystallization zone at a rate sufficient to circulate at least six times the volumetric holdup of the crystallizer per minute and up to twenty times the volumetric holdup per minute. The condition of turbulent agitation can be produced within the crystallization zone by mechanical agitation of a conventional stirring mechanism, such as a driving shaft containing one or more propellers or paddles positioned along the vertical length thereof and providing sufficient turbulent action to effect the result desired. Another method by which the agitation can be accomplished is to inject one or more streams of liquid spacer and/or spent acid and/or slurry of crystals into the crystallization zone at linear velocities in excess of about 50 feet per second, and preferably at linear velocities of about 100 to about 400 feet per second. In one method of operation, the spent acid is introduced into the top part of the crystallization zone, consequently, there is a strong tendency for agglomeration of crystals to occur within the bottom part of the crystallization zone. To safeguard against undue agglomeration of acid crystals, a jet or a plurality of jets of liquid spacer is fed at the velocities specified upwardly through or directly into the descending mass of crystallization medium thereby creating the turbulent agitation which is desirable for this step of the process. In the ideal condition, the crystallization medium will appear as a homogeneous slurry of acid crystals dispersed throughout the crystallization medium which may be the mother liquor with or without liquid spacer. At the withdrawal point of crystal slurry from the crystallization zone, it is desirable to inject organic liquid spacer in countercurrent flow to the outgoing crystal slurry or any other direction relative thereto which will effect the desired turbulent condition. Alternatively, a portion of slurry may be withdrawn from the crystallizer, at the top or side or any other point spaced from the outlet and injected into the crystallizer as just described for the liquid spacer to prevent agglomeration at the outlet and in the crystallization zone.

Any combination of the various previously described methods for obtaining the required agitation can be practiced without departing from the scope of this invention. For example, mechanical agitation can be used simultaneously with high velocity injection of a fluid stream into the crystallization zone. The source of the fluid injected is preferably a slurry withdrawn from the lower portion of the crystallization zone.

Another important problem with respect to the operation of a system involving the purification of sulfuric acid by crystallization is that there is a tendency for the sulfuric acid crystals to agglomerate within the transfer zones or lines interconnecting, for example, the crystallization zone with the separation zone wherein the acid crystals are separated from the mother liquor, with or without liquid spacer, and the transfer zone or line by which the slurry of acid crystals is recycled to the crystallization zone for the purpose described hereinabove. It was found, in actual practice, that the linear velocity of the slurry being transported should be in excess of 15 feet per second, otherwise there is a strong tendency for the acid crystals to agglomerate and thus plug the transfer zones. Usually, the linear velocity of the slurry is about 15 to about 40 feet per second and in commercial practice, it appears to be desirable to design the linear velocity at a value of about 30-35 feet per second.

In order to provide a better understanding of this invention, reference will be had to the accompanying drawing which forms a part of this specification and illustrates a specific embodiment of the present invention.

In the drawing, olefin feed containing 20% propylene and 80% butylene is fed from source 5 at the rate of 3240 b.p.d., and this stream is divided such that one-half of the same is fed through line 6 and the remaining portion is fed through line 7. These split streams of olefin feed are fed through mixers 17 and 18 of alkylation reactor 9. Alkylation reactor 9 contains baffles 10, 11 and 12 which divide part of the reactor into two reaction zones, namely, 14 and 15. The reactant material in zone 14 is agitated by means of mixer 17; whereas in section 15 the reactant material is agitated by means of mixer 18. Isoparaffin feed, e.g., isobutane, is fed to section 14 at the rate of 11,600 b.p.d. by means of line 20. Sulfuric acid containing 96% free acid is fed to section 14 at the rate of 1000 b.p.d. by means of line 21. The conditions within sections 14 and 15 are sufficient to effect alkylation of butylene with isobutane and these conditions include a temperature of about 35° F. and a pressure of about 5 p.s.i.g. It should be understood that the conditions and reactant materials employed in this example are merely illustrative, because the present invention is adapted to the alkylation process broadly involving an olefin containing, for example, 3 to 6 carbon atoms and an isoparaffin containing about 4 to 8 carbon atoms. The relative portion of isoparaffin to olefin varies from about 50 to about 5000 mols of the former per mol of the latter. Based on the olefin feed, the sulfuric acid charged to the reaction zone is about 0.3 to about 15 parts by volume per part of olefin charged per hour thereto. The sulfuric acid can have a total acidity ranging from about 90 to about 100%. The reaction can be conducted at a temperature of about 20° to about 100° F. and a pressure of about 1 atmosphere to about 25 p.s.i.g.

As a result of the conditions in sections 14 and 15 of the alkylation reactor, the total reaction mixture passes over partitioning baffle 12 and enters a settling zone 23. In this settling zone, a final separation of acid from the reaction product is effected. Consequently, the reaction product being lighter, generally exists as the supernatant phase; whereas the acid is the lower phase. The acid is withdrawn from the bottom of section 23 by means of line 24, and it is pumped by means of pump 25 through line 26. A portion of the acid is recycled to the alkylation reactor 9 by means of lines 27 and 21; whereas the remaining portion, namely, about 200 b.p.d. passes through line 28 and it is earmarked for purification in accordance with the technique of the present invention to be discussed hereinafter. The supernatant layer of reaction product passed over baffle 30 from section 23 and enters a surge zone or section 31. The reaction product containing alkylate is discharged from the bottom of section 31 by means of line 33, and it is further processed for the recovery of alkylate in a recovery system (not shown). By virtue of the conditions prevailing in the alkylation reactor 9, part of the hydrocarbon reactant is vaporized in order to maintain the desired temperature therein. The vaporized hydrocarbon is withdrawn overhead from alkylation reactor 9 by means of line 34, and it passes to a separator 35. Any liquid contained in separator 35 is discharged from the bottom thereof through line 36, and it is returned to the alkylation reactor. The vaporized hydrocarbon in separating drum 35 passes from the top thereof through line 38 and then it is compressed to a pressure of about 90 p.s.i.g. by means of compressor 40. Following the compression stage, the compressed hydrocarbon passes from compressor 40 to a cooler or condenser 41 by means of ilne 42. The condensed hydrocarbon passes from condenser 41 through line 43 which leads to the top of a surge drum 44.

The condensed hydrocarbon is withdrawn from surge drum 44 by means of line 46 and a portion thereof, namely, 4000 b.p.d., is passed through line 47, which leads to pump 48, and thence it is pumped to a depropanizer column 50 by means of line 51. In the depropanizer column the top temperature is maintained at 110° F.; whereas the bottom temperature is maintained at 180° F. The pressure in the top of the tower is 185 p.s.i.g. Propane vapor is discharged from the top of the depropanizer column 50 by means of line 53. A portion of the propane vapor, at the rate of 1225 pounds per hour, is passed from line 53 to line 54 and the utilization of this stream will be discussed hereinafter. 38,000 pounds per hour of propane vapor is passed through line 53 to another line 55, and this material flows to a condenser 56, and thence to a surge drum 57 by means of line 58. The condensed propane in surge drum 57 is discharged from the bottom thereof by means of line 60, and this material is pumped by means of pump 61 such that about 55 b.p.d. are passed through line 62 and utilized in a manner discussed hereinafter; whereas 4400 b.p.d. are recycled to the depropanizer column 50 by means of line 63. The remaining portion of propane vapor is discharged from line 53 at the rate of 4500 pounds per hour through line 64. The net production of propane is yielded from the system by means of line 65. $C_4$ and heavier hydrocarbons which are present in the feed to the depropanizer column is discharged from the bottom thereof by means of line 66 at the rate of 2950 b.p.d.

For the purification of the spent sulfuric acid from the alkylation system and flowing through line 28, it is desirable to add fuming sulfuric acid thereto in order to reduce the water concentration. Originally, the spent acid contains 2% of water by weight and fuming sulfuric acid is combined with the spent acid by means of line 70 at the rate of 20 b.p.d. in order to reduce the water concentration below about 0.5% by weight. It should be understood that it is not necessary to reduce the water concentration to zero in order to obtain a reasonable recovery of purified acid. The combined stream of fuming sulfuric acid and spent acid passes through line 72, and then this material is combined with recycled sulfuric acid, to be discussed in greater detail hereinbelow, at the rate of 20 b.p.d., by means of line 73. The combined sulfuric acid streams pass through line 74, and thence into the crystallizer 77. The acid stream is sprayed into an organic liquid spacer, which also serves as the auto-refrigerant comprising propane and isobutane. The quantity of spacer added to the crystallizer is sufficient to make up what is discharged therefrom, and the concentration of propane in the spacer varies with the temperature required for crystallization.

The crystallizer 77 contains a stirring mechanism 78 illustrated as a vertical shaft containing propellers 79. The purpose of the stirring mechanism is to maintain the crystallization medium in a turbulent state of agitation to prevent stratification or separation of the spacer from the mother liquor. The temperature in the crystallizer is maintained at −35° F. and at a pressure of 5 inches of water. As a result of these conditions, a portion of the spacer is vaporized, consequently, cooling the crystallization medium. The vaporized spacer is discharged from the top of the crystallizer 77 by means of line 80. It should be noted that one of the propellers of the stirring mechanism 78 is positioned within the bottom part of conical section 82 of the crystallizer in order to prevent bridging or plugging of the effluent material due to agglomeration of the sulfuric acid crystals. The sulfuric acid crystals present in the spacer and mother liquor tend to agglomerate due to the highly viscous nature of the mother liquor. A slurry of spacer, crystals and mother liquor is withdrawn from the bottom of conical section 82 by means of line 83, and it is transported by means of pump 84.

The pumped slurry is passed through line 85 at the rate of 8500 b.p.d., and this stream is divided such that a portion, namely, six times the volumetric holdup per minute is recycled to the crystallizer by means of line 86. In this regard, the volume of slurry recycled to the crystallizer relative to the volume of spent acid which is processed to the crystallizer by means of line 74, stands in the ratio of about 50 to about 500 parts of slurry per part of acid feed. The recycling of slurry serves two purposes, namely, it assists in creating a turbulent state in the crystallizer, and also it serves to "seed" or initiate crystallization of the incoming sulfuric acid. The remaining portion of slurry which is passing through line 85 is passed through line 87. It is important to note that the slurry of acid crystals, mother liquor and spacer should flow through lines 85, 86 and 87 at a linear velocity in excess of 15 feet per second, otherwise there is a tendency for the acid crystals to agglomerate and thus plug these lines. In this example, the linear velocity of material in lines 85, 86 and 87 is 30 feet per second.

The net production of acid crystals passing through line 87 is passed to a centrifugal filter shown schematically as 90. This filter is of well-known design and it comprises essentially a rotating drum (not shown) upon which the acid crystals are deposited as a cake, and the filtrate passes to the interior thereof for subsequent discharge from the filter. During the course of its operation, wash liquor is contacted with the cake of acid crystals, and thereby serves to remove any sorbed or occluded impurities from the crystal cake. With respect to the drawing, the wash liquor is of the same composition as the auto-refrigerant and it is fed to the centrifugal filter by means of line 91 at the rate of 0.1 to 1.0 gallon per second. The wash liquor has a temperature of −35° F. The filtrate from the centrifugal filter 90 is discharged therefrom by means of line 93, and this material is passed to separator 94 wherein the hydrocarbon material, namely, propane-isobutane, is discharged overhead by means of line 95 and the mother liquor is discharged from the bottom thereof by means of line 96. In this operation, 20 b.p.d. of mother liquor are produced. The motor liquor at this stage of the operation is at a temperature of −35° F. The motor liquor is passed from line 96 to a holding or settling vessel or zone 97 equipped with a heating coil 98. The mother liquor has a residence time of 30 minutes within the settler 97, and the temperature within the settler is maintained at 50° F. It should be understood, however, that the settling time or residence time of the mother liquor in settler 97 can range from about 1 to about 5000 minutes and the temperature can vary from about 0 to about 150° F. As a result of the conditions prevailing in settler 97, a supernatant phase or layer of hydrocarbon material is formed, and this material is the non-polar impurity which, by analysis, is found to be an alkylate product. The alkylate product is discharged from the settler 97 by means of line 100 at the rate of 20 b.p.d. Initially, the mother liquor being fed to the settler 97 has an acidity of 70%. By virtue of the separation in settler 97, the resultant acid phase has a titratable acidity of 94% or a free acidity of about 90%. The acid of increased concentration is discharged from the bottom of settler 97 by means of line 102. A portion of the acid in line 102 is discharged from the system by means of line 103 and the remaining portion of acid passing through line 102 flows into line 104 and thence, by means of pump 105, it is recycled to the crystallizer by means of line 73, previously mentioned. It is important to note at this point that the temperature condition within settler 97 should be sufficiently high to avoid the formation of crystals therein, otherwise difficulties may occur in the handling of the acid for recycle to the crystallizer. Further, the temperature is preferably below about 150° F., because there may be a tendency for the acid to decompose at higher temperatures, and therefore, increase the loss of acid through evolution of sulfur oxide and water.

The spacer material which is discharged from separator 94 is passed to a collection zone or decanter or holding vessel 108. Collector 108 serves as a means for collecting all of the spacer streams, both vapor and liquid, which are discharged from the various pieces of apparatus in the process, and thereby a fairly uniform composition of organic liquid spacer is employed in various stages of the operation.

The acid crystals which are separated from the slurry by means of centrifugal filter 90 are discharged by means of conduit 110 into a melting zone or melter 111. The temperature in the melter is maintained at 50° F. by removing or discharging melted or liquid sulfuric acid from the bottom thereof by means of line 113 and transporting the same by means of pump 114 and line 115 to a heat exchanger 116. In the heat exchanger, the liquid surfuric acid of about 100% total acidity is heated from a temperature of 50° F. to about 70° F. The heated sulfuric acid is discharged from the heat exchanger 116 by means of line 117 and a portion thereof, namely, about 1200 b.p.d. is recycled to the melter 111 by means of line 120. The remaining portion of sulfuric acid is discharged from line 117 to line 121, and this material is transported to line 21, whereby it is subsequently utilized in the akylation reactor. Any organic liquid spacer which is vaporized within melter 111 or centrifugal filter 90 is discharged therefrom by means of lines 123 and 124, respectively.

The vaporized organic liquid spacer in lines 80, 123 and 124 is passed into a header 126 which is connected to the top of collector 108. The composition of the organic liquid spacer is maintained relatively constant by supplying thereto isobutane and propane at a constant rate. This is accomplished by passing a portion of the condensed hydrocarbon from the auto-refrigerant system of the alkylation reactor to the collector 108. The condensed hydrocarbon contains propane and isobutane and this material is passed from the bottom of surge drum 44 by means of line 46 such that a portion is subjected to separation treatment in the depropanizer mentioned hereinabove and the remaining portion, namely, containing 80–90% by volume of butane, is passed through line 128 and thereby enters the top of collector 108. In order to supply heat for melter 111 wherein acid crystals are melted to the liquid form, the propane vapor stream of the depropanizer is passed through line 54 and enters heat exchanger 116 for indirect exchange of heat therein. The vaporous propane stream having a temperature of 110° F. is reduced in temperature to 105° F. and thereby liquefied. The cooled or liquefied propane stream passes from heat exchanger 116 and enters line 130, and thence this material is passed to collector 108 by means of line 131. Liquefied propane which is produced in the depropanizer column and is passed through line 62 enters the top of collector 108 by means of line 131. Any vaporized hydrocarbon present within collector 108 is discharged overhead therefrom by means of line 135 and this material is passed to the auto-refrigeration system of the alkylation reactor. In this respect, the vaporized stream in line 135 combines with the vaporized hydrocarbon in line 38 prior to being compressed by means of compressor 40. Organic liquid spacer is withdrawn from collector 108 by means of line 140, and this material is transported by means of pump 141 such that a portion is utilized as spacer and auto-refrigerant in the crystallizer 77 and the remaining portion is passed through line 91 for the purpose of washing the acid crystals which are present as a cake on the rotating drum (not shown) of the centrifugal filter 90.

Having thus provided a written description of my invention, along with a specific example thereof, it should be understood that no undue limitations or restrictions are to be imposed by reason thereof, but that the scope of the invention is defined by the appended claims.

I claim:

1. In a process in which spent sulfuric acid is crystallized in a crystallization zone to produce a product comprising mother liquor and crystals of sulfuric acid and in which said product is withdrawn from said crystallization zone, the method for preventing the agglomeration of said crystals which comprises injecting a portion of the product thus withdrawn into said crystallization zone at a linear velocity of at least 50 feet per second to prevent agglomeration of the crystals.

2. In a process in which spent sulfuric acid is crystallized in a crystallization zone to produce a product comprising mother liquor and crystals of sulfuric acid and in which said product is withdrawn from said crystallization zone, the method for preventing the agglomeration of said crystals which comprises injecting a portion of the product thus withdrawn into said crystallization zone at a linear velocity of about 100 to about 400 feet per second to prevent agglomeration of the crystals.

3. In a process in which spent sulfuric acid is crystallized in the presence of an organic liquid spacer in a crystallization zone to produce sulfuric acid crystals, mother liquor and organic liquid spacer, the method of operating to prevent agglomeration of crystals which comprises injecting a slurry of sulfuric acid crystals, mother liquor and liquid spacer into said crystallization zone at a linear velocity of at least 50 feet per second to prevent substantial separation of mother liquor from spacer within said crystallization zone.

4. In a process in which spent sulfuric acid is crystallized in the presence of an organic liquid spacer in a crystallization zone to produce sulfuric acid crystals, mother liquor and organic liquid spacer, the method for prevent-agglomeration of crystals which comprises, injecting a slurry of sulfuric acid crystals, mother liquor and liquid spacer into said crystallization zone at a linear velocity of at least 50 feet per second and simultaneously mechanically agitating the contents of said crystallization zone to prevent substantial separation of mother liquor from spacer within said crystallization zone.

References Cited in the file of this patent

UNITED STATES PATENTS

| 2,034,615 | Gensecke | Mar. 17, 1936 |
| 2,716,592 | Skelly et al. | Aug. 30, 1955 |

OTHER REFERENCES

Perry: "Chem. Eng. Handbook," 1950, 3rd ed., pp. 1062–63.

UNITED STATES PATENT OFFICE

CERTIFICATE OF CORRECTION

Patent No. 2,903,339 September 8, 1959

Samuel R. Stiles

It is hereby certified that error appears in the printed specification of the above numbered patent requiring correction and that the said Letters Patent should read as corrected below.

Column 5, line 69, for "ilne" read — line —; column 7, lines 38 and 39, for "motor", each occurrence, read — mother —.

Signed and sealed this 19th day of April 1960.

(SEAL)
Attest:

KARL H. AXLINE
Attesting Officer

ROBERT C. WATSON
Commissioner of Patents